United States Patent
Tsai

(10) Patent No.: US 9,776,684 B2
(45) Date of Patent: Oct. 3, 2017

(54) DERAILLEUR

(71) Applicant: TEKTRO TECHNOLOGY CORPORATION, Changhua County (TW)

(72) Inventor: Szu-Fang Tsai, Taichung (TW)

(73) Assignee: TEKTRO TECHNOLOGY CORPORATION, Changhua County (TW)

(*) Notice: Subject to any disclaimer, the term of this patent is extended or adjusted under 35 U.S.C. 154(b) by 162 days.

(21) Appl. No.: 14/709,122

(22) Filed: May 11, 2015

(65) Prior Publication Data

US 2016/0107723 A1 Apr. 21, 2016

Related U.S. Application Data

(60) Provisional application No. 62/065,203, filed on Oct. 17, 2014.

(51) Int. Cl.
| | |
|---|---|
| *B62M 9/124* | (2010.01) |
| *F16H 37/12* | (2006.01) |
| *B62M 9/122* | (2010.01) |
| *F16H 49/00* | (2006.01) |

(52) U.S. Cl.
CPC ............ *B62M 9/124* (2013.01); *B62M 9/122* (2013.01); *F16H 37/122* (2013.01); *F16H 49/001* (2013.01)

(58) Field of Classification Search
CPC ..... B62M 9/122; B62M 9/124; F16H 37/122; F16H 49/001
See application file for complete search history.

(56) References Cited

U.S. PATENT DOCUMENTS

| | | | | |
|---|---|---|---|---|
| 2,906,143 | A * | 9/1959 | Walton ................. | F16H 49/001 285/276 |
| 6,623,389 | B1 * | 9/2003 | Campagnolo ......... | B62M 9/122 474/70 |
| 9,327,792 | B2 * | 5/2016 | Johnson ................ | B62K 23/04 |
| 2004/0014541 | A1 * | 1/2004 | Dal Pra ................. | B62M 9/122 474/70 |

(Continued)

OTHER PUBLICATIONS

Wikipedia Article: Harmonic Drive, last modified on Feb. 20, 2017.*

*Primary Examiner* — William E Dondero
*Assistant Examiner* — Robert T Reese
(74) *Attorney, Agent, or Firm* — Maschoff Brennan

(57) ABSTRACT

A derailleur includes a fixed component, a movable component, a linkage component, a deceleration component and a drive component. The fixed component is for being fixed to a bicycle frame. The movable component is for being fixed to a chain guide. The linkage component includes a first linkage and a second linkage. Two ends of the first linkage pivot on the fixed component and the movable component, respectively. Two ends of the second linkage pivot on the fixed component and the movable component, respectively. The deceleration component includes a circular spline, a flex spline and a wave generator. The flex spline is disposed inside the circular spline, for rotating the first linkage and the second linkage relative to the fixed component. The wave generator is disposed inside the flex spline. The drive component is connected to the wave generator, for rotating the wave generator.

15 Claims, 20 Drawing Sheets

(56) References Cited

U.S. PATENT DOCUMENTS

| | | | |
|---|---|---|---|
| 2014/0087901 A1* | 3/2014 | Shipman | B62M 9/132 474/82 |
| 2014/0121047 A1* | 5/2014 | Katsura | B62M 9/122 474/80 |
| 2015/0111675 A1* | 4/2015 | Shipman | B62M 9/122 474/82 |
| 2015/0126314 A1* | 5/2015 | Pasqua | B62M 9/122 474/82 |
| 2016/0245386 A1* | 8/2016 | Rossberger | F16H 49/001 |

* cited by examiner

DERAILLEUR

CROSS-REFERENCE TO RELATED APPLICATIONS

This non-provisional application claims priority under 35 U.S.C. §119(e) on Provisional Application No(s). 62/065,203 filed on Oct. 17, 2014, the entire contents of which are hereby incorporated by reference.

BACKGROUND

Technical Field

The disclosure relates to a derailleur. More particularly, the disclosure relates to a derailleur for a bicycle.

Background

In recent years, bicycles are popular for users to ride in bicycle races or their daily lifes. Generally speaking, bicycles are usually equipped with a derailleur for shifting a chain to different cassettes (i.e., sprockets) according to different topographic features or requirements. The derailleur can be classified into a front derailleur and a rear derailleur. The rear derailleur is usually assembled with a frame of the bicycle for maintaining the chain on the cassette. According to the structure and the shift cable of the bicycle, the bicycle is equipped with different kinds of rear derailleurs.

For example, bicycles have been equipped with electrical components to make riding easier and more enjoyable for the rider. Some bicycles are equipped with automatic derailleurs having a motor to facilitate the bicycle riding.

SUMMARY

One aspect of the disclosure provides a derailleur, which includes a fixed component, a movable component, a linkage component, a deceleration component and a drive component. The fixed component is for being fixed to a bicycle frame. The movable component is for being fixed to a chain guide. The linkage component includes a first linkage with two ends which are opposite to each other and a second linkage with two ends which are opposite to each other. The two ends of the first linkage pivot on the fixed component and the movable component, respectively. The two ends of the second linkage pivot on the fixed component and the movable component, respectively. The deceleration component includes a circular spline, a flex spline and a wave generator. The flex spline is disposed inside the circular spline, for rotating the first linkage and the second linkage relative to the fixed component. The wave generator is disposed inside the flex spline. The drive component is connected to the wave generator, for rotating the wave generator.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
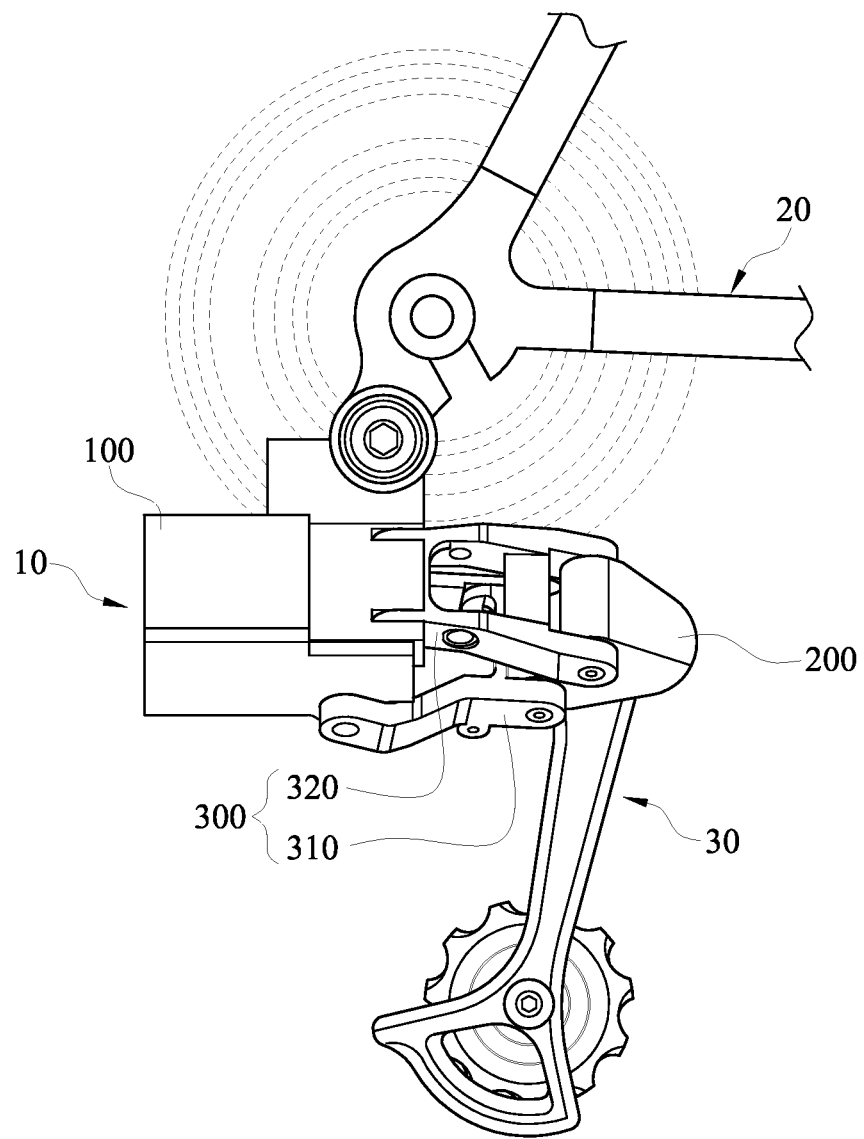
FIG. 1 is a partially plan view of a derailleur according to a first embodiment of the disclosure which is fixed to a bicycle frame.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
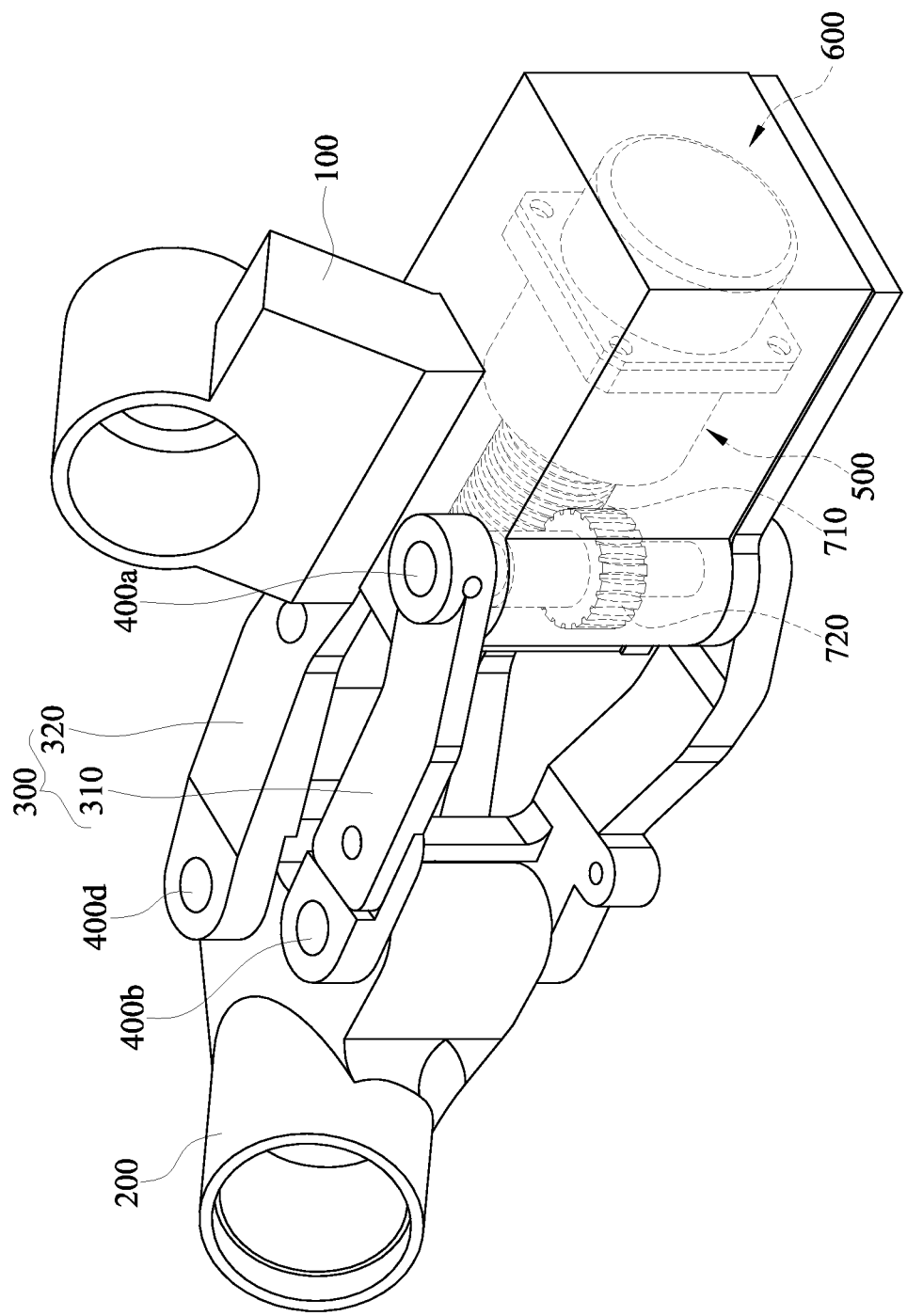
FIG. 2 is a perspective view of the derailleur in FIG. 1.
Figure 3A:
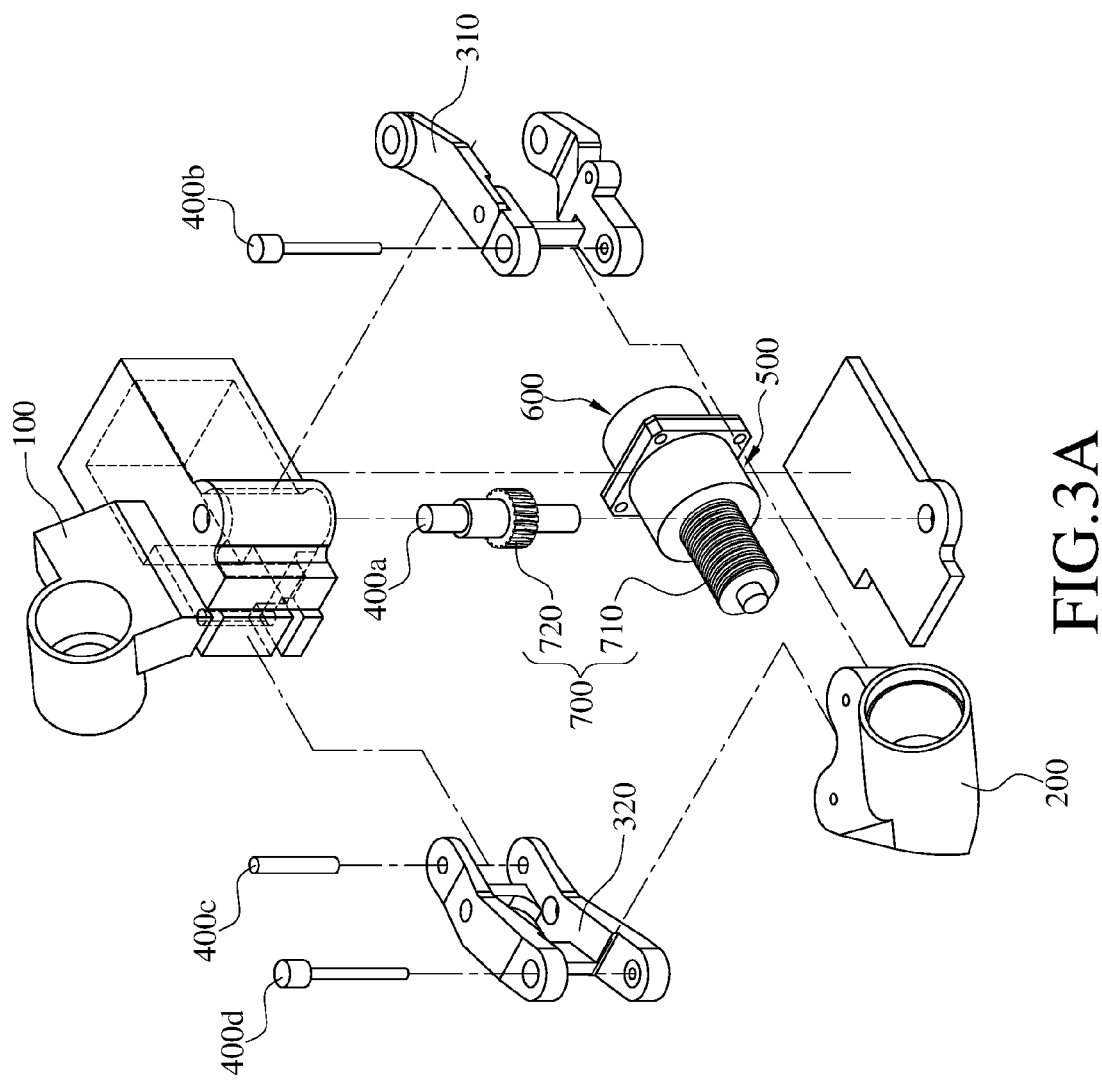
FIG. 3A is an exploded view of the derailleur in FIG. 2.
Figure 3B:
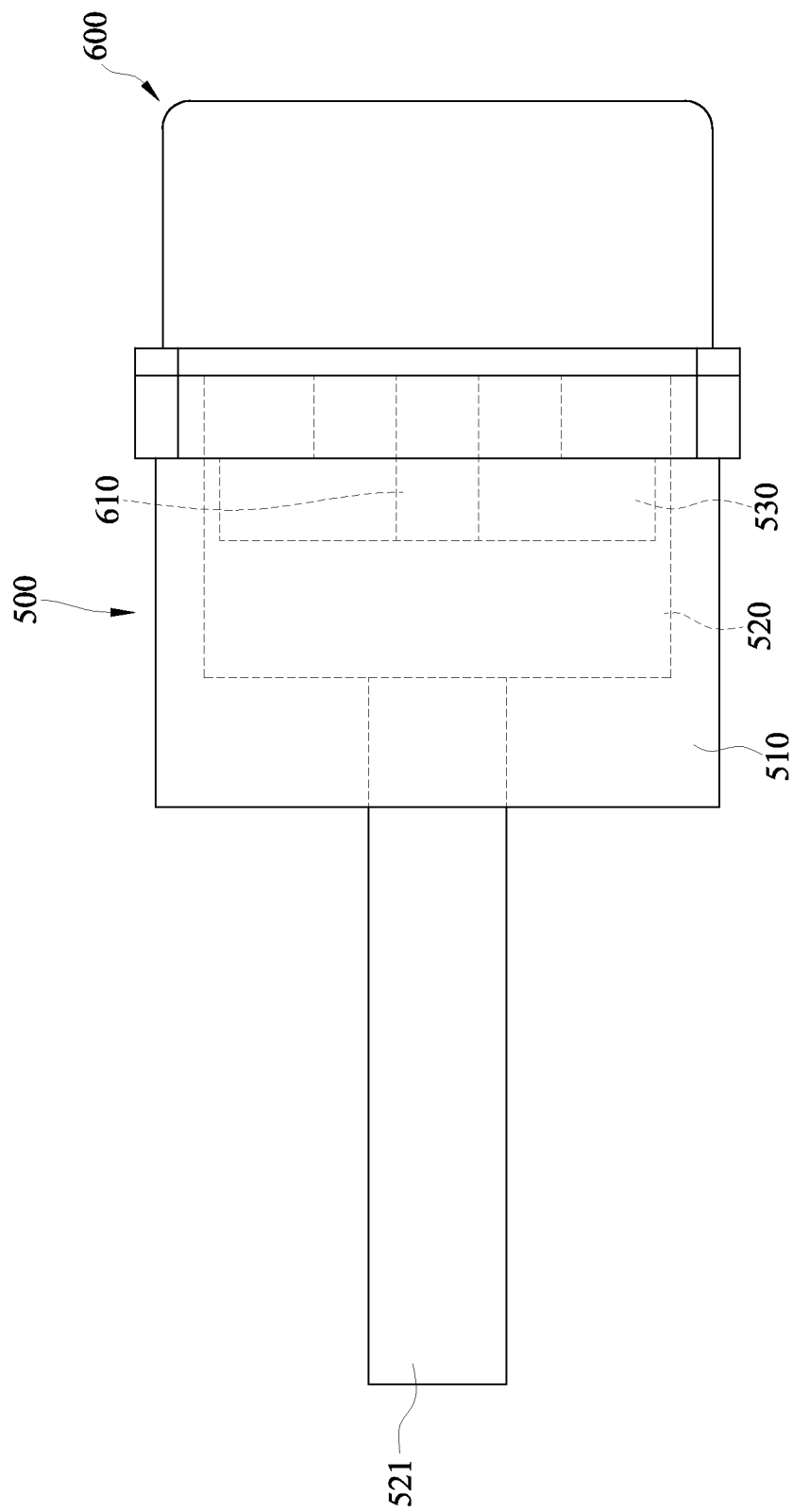
FIG. 3B is a perspective view of a deceleration component and a drive component in FIG. 3A.

Please refer to FIG. 1 through FIG. 3B. FIG. 1 is a partially plan view of a derailleur according to a first embodiment of the disclosure which is fixed to a bicycle frame. FIG. 2 is a perspective view of the derailleur in FIG. 1. FIG. 3A is an exploded view of the derailleur in FIG. 2. FIG. 3B is a perspective view of a deceleration component and a drive component in FIG. 3A. In this embodiment, the derailleur 10 is utilized as a rear derailleur. Moreover, the derailleur 10 is fixed to a bicycle frame 20 and connected to a chain guide 30.

Specifically, as shown in FIG. 1 through FIG. 3A, the derailleur 10 includes a fixed component 100, a movable component 200, a linkage component 300, a plurality of pivot pins 400a, 400b, 400c and 400d, a deceleration component 500 and a drive component 600. The fixed component 100 is for being fixed to the bicycle frame 20. The movable component 200 is able to move relative to the fixed component 100 and fixed to the chain guide 30. The linkage component 300 includes a first linkage 310 and a second linkage 320. The first linkage 310 has two ends which are opposite to each other, and the second linkage 320 has two ends which are opposite to each other. The two ends of the first linkage 310 pivot on the fixed component 100 and the movable component 200 via the pivot pins 400a and 400b, respectively. The two ends of the second linkage 320 pivot on the fixed component 100 and the movable component 200 via the pivot pins 400c and 400d, respectively. Additionally, in this embodiment, when the pivot pin 400a rotates, the first linkage 310, the second linkage 320 and the movable component 200 are driven to move relative to the fixed component 100.

As shown in FIG. 3A and FIG. 3B, the structure of the deceleration component 500 is similar to that of a harmonic drive. The deceleration component 500 includes a circular spline 510, a flex spline 520 and a wave generator 530. The circular spline 510 is fixed to the fixed component 100. The circular spline 510 is stiff and a ring with a plurality of internal teeth and an internal surface, and the internal teeth are disposed on the internal surface. The flex spline 520 is disposed inside circular spline 510. The flex spline 520 is a cup with a plurality of external teeth and an external surface, and the external teeth are disposed on the external surface. The external teeth of the flex spline 520 are corresponding to the internal teeth of the circular spline 510. The quantity of the external teeth of the flex spline 520 is less than the quantity of the internal teeth of the circular spline 510. The wave generator 530 is rotatably disposed inside the flex spline 520.

When the wave generator 530 rotates, the flex spline 520 is driven to deform, and a part of flex spline 520 is meshed with the circular spline 510. Due to the difference between the quantity of internal teeth of the circular spline 510 and the quantity of external teeth of the flex spline 520, the flex spline 520 is able to rotate relative to the wave generator 530 according to a speed reduction ratio (namely, reduced speed ratio).

The flex spline 520 includes a first torque output shaft 521. The first torque output shaft 521 is connected to the pivot pin 400a via the transmission component 700 for driving the first linkage 310 and the second linkage 320 to rotate. Specifically, in this embodiment, the transmission component 700 includes a worm 710 and a worm gear 720 which are meshed with each other. The worm 710 is fixed to the first torque output shaft 521 coaxially. The worm gear 720 is coaxially fixed to the pivot pin 400a which is connected to the fixed component 100 and the first linkage 310. Thus, when the first torque output shaft 521 rotates, the first linkage 310 is driven to rotate relative to the fixed component 100 by the transmission component 700 and the pivot pin 400a.

In this embodiment, the transmission component 700 is a worm gear set which functions as self-locking. The power transmission of the worm gear set is limited to one direction. In other words, the worm 710 is able to drive the worm gear 720 to rotate, but the worm gear 720 is unable to drive the worm 710 to rotate. Therefore, when the movable component 200 or the linkage component 300 is hit by an external force, the worm gear set can effectively block the external force so as not to allow the external force to transmit to the deceleration component 500, thereby preventing the deceleration component 500 from damage.

The drive component 600, for example, is a motor. The drive component 600 includes a second torque output shaft 610. The second torque output shaft 610 is connected to the wave generator 530 for rotating the wave generator 530.

A deceleration effect is produced by both the deceleration component 500 and the transmission component 700. A speed reduction ratio produced by the deceleration component 500 is about 30 to 100, and a speed reduction ratio produced by the transmission component 700 is about 10 to 40. Thus, in this embodiment, a high speed reduction ratio is produced by the deceleration component 500 and transmission component 700 at the same time. For example, the high speed reduction ratio is 1000. When a torque outputted by the second torque output shaft 610 of the drive component 600 is 0.01 newton-meter (N-m), a torque outputted by the pivot pin 400a connected to the fixed component 100 and the first linkage 310 is increased to 10 N-m.

Accordingly, in this embodiment, the derailleur 10 has high speed reduction ratio and becomes smaller in size and lighter in weight due to the combination of the circular spline 510, the flex spline 520 and the wave generator 530 of the deceleration component 500. That is to say, compared with a gearbox with the same speed reduction ratio, the derailleur 10 is miniaturized in order to comply with the requirement of users.

Figure 4:
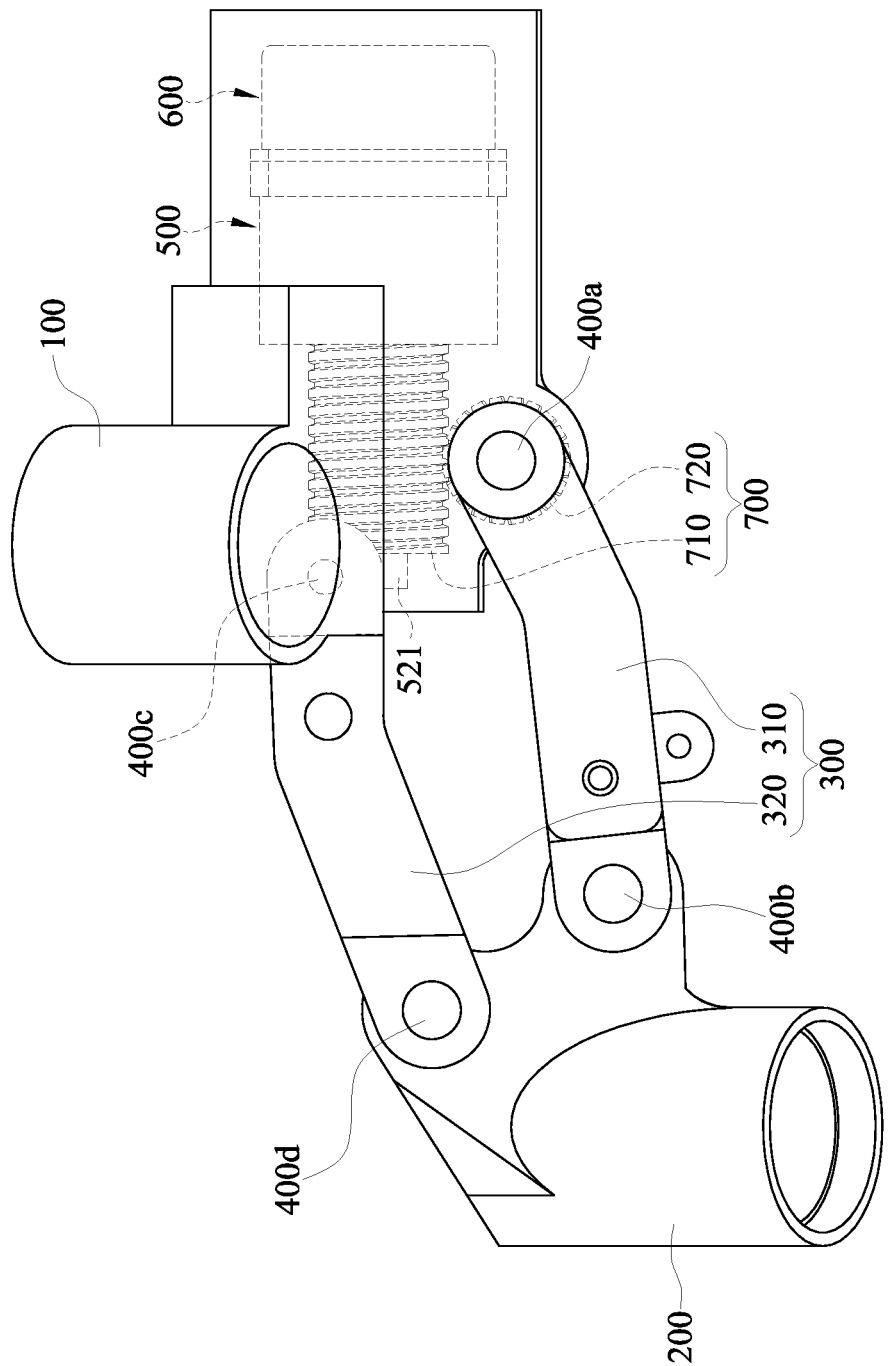
FIG. 4 and FIG. 5 are schematic views of the derailleur in FIG. 2 during operation.
Figure 5:
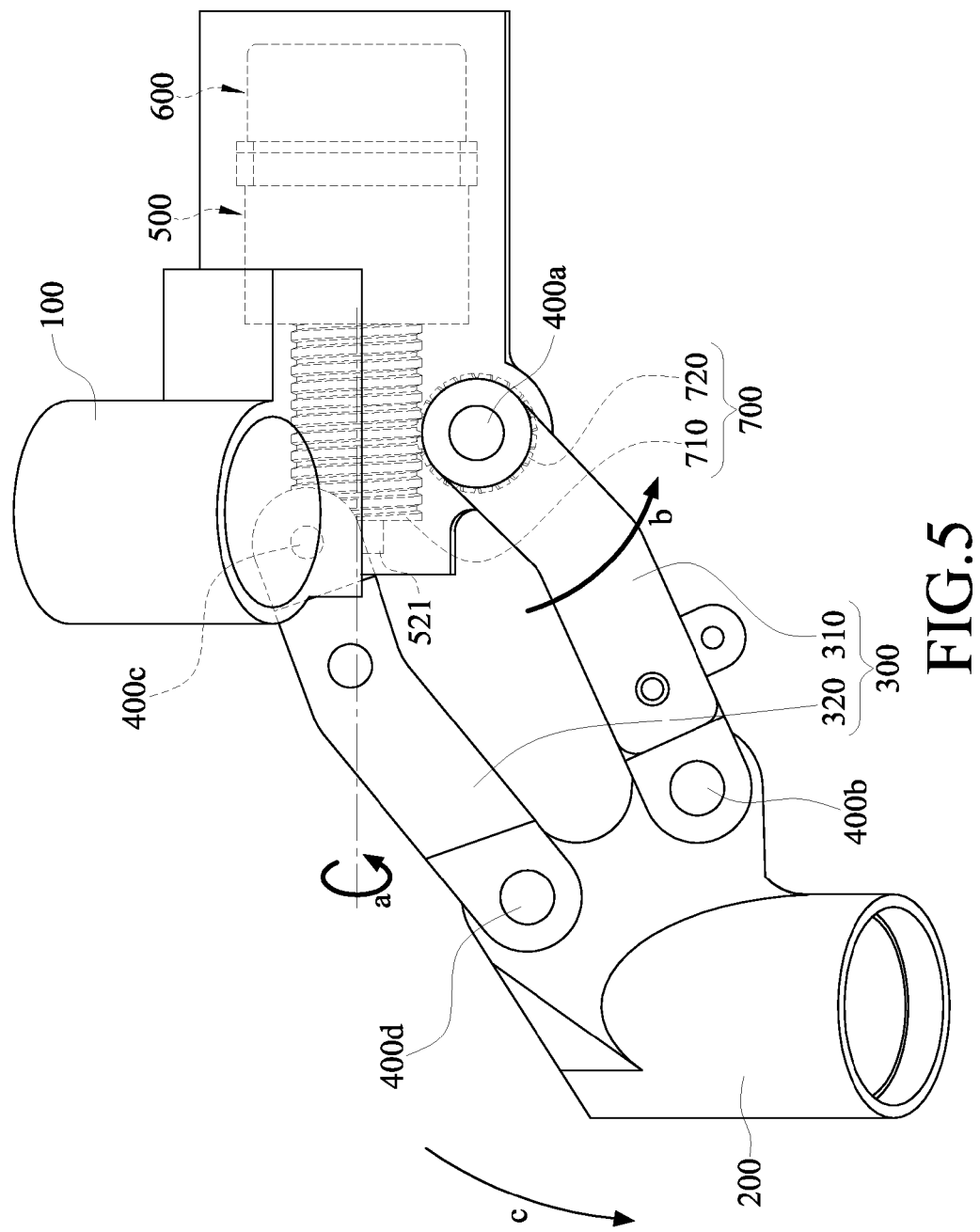

Please refer to FIG. 4 and FIG. 5 which are schematic views of the derailleur in FIG. 2 during operation. As shown in FIG. 4, the movable component 200 of the derailleur 10 is at a first usage position. As shown in FIG. 5, when the first torque output shaft 521 of the flex spline 520 rotates along an arrow a, the worm gear 720 fixed to the pivot pin 400a is driven to rotate along an arrow b by the worm 710 of the first torque output shaft 521. Then, the movable component 200 is driven to move along a curve path (as indicated by an arrow c) to a second usage position by the linkage component 300. Therefore, the chain guide 30 (as shown in FIG. 1) is driven to be closer to or away from the bicycle frame 20 by the movable component 200, for changing the speed of the bicycle (not shown in figures).

Figure 6:
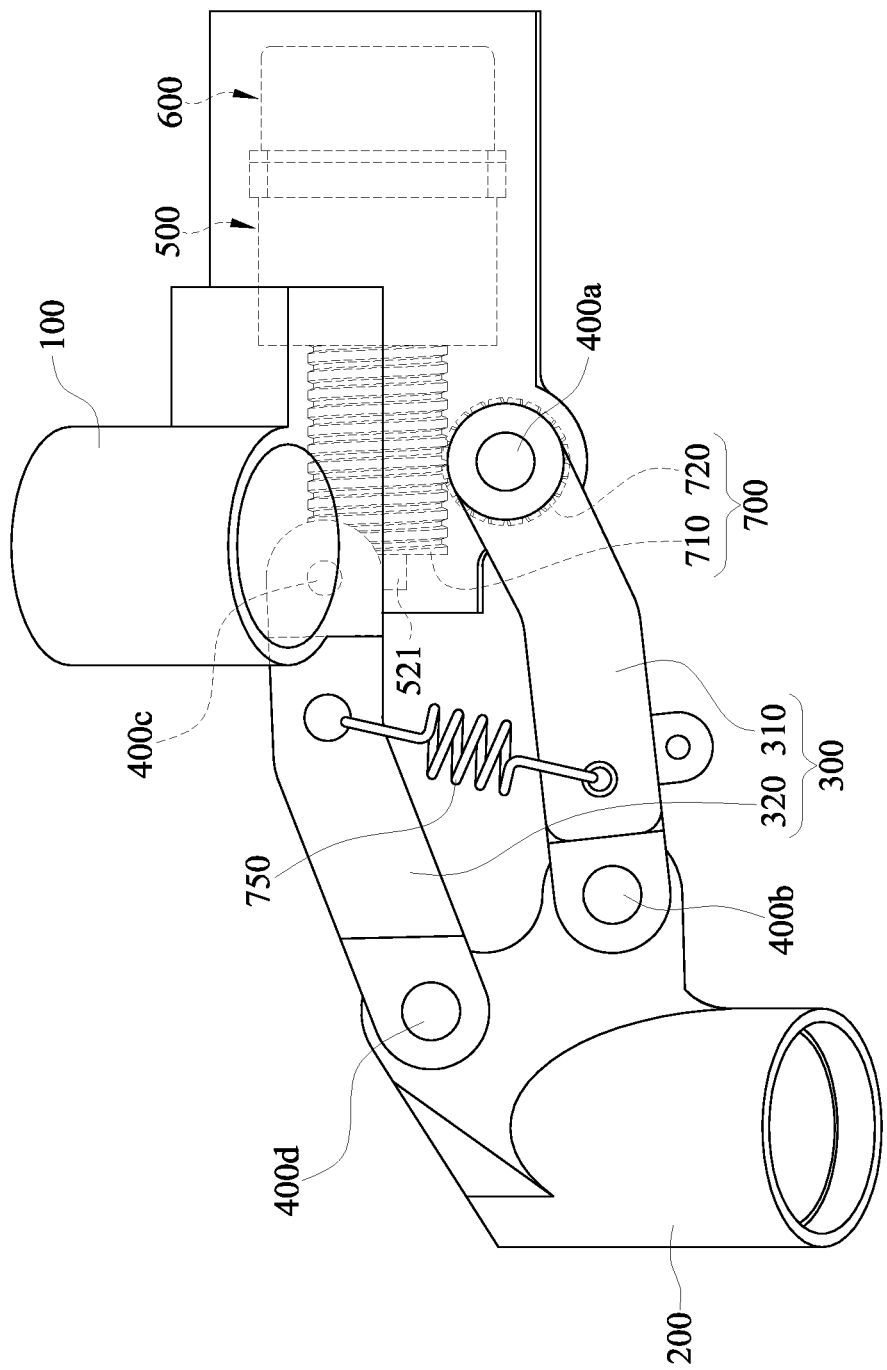
FIG. 6 is a side view of a derailleur according to a second embodiment of the disclosure.

Please refer to FIG. 6 which is a side view of a derailleur according to a second embodiment of the disclosure. In this embodiment, the derailleur 10 further includes an elastic component 750. The elastic component 750, for example, is a tension spring. The elastic component 750 has two ends which are opposite to each other. One of the two ends of the elastic component 750 is connected to an end of the first linkage 310 which is away from the fixed component 100, and the other end of the elastic component 750 is connected to an end of the second linkage 320 which is near the fixed component 100.

An elastic force provided by the elastic component 750 is able to help the chain guide 30 to move toward the bicycle frame 20 (as shown in FIG. 1) and help a chain (not shown in figures) of the bicycle (not shown in figures) for move to a larger cassette from a smaller cassette smoothly.

Additionally, the derailleur 10 is positioned by the elastic force provided by the elastic component 750 in order to reduce an interference generated by a shock when the bicycle rides on an uneven road. Furthermore, backlashes between each gear of the derailleur 10 are diminished by the elastic force provided by the elastic component 750, and the stability and accuracy of the derailleur 10 is improved accordingly.

According to the first embodiment shown in FIG. 1 through FIG. 6, the pivot pin 400a connected to the fixed component 100 and the first linkage 310 is driven to rotate by the first torque output shaft 521 of the flex spline 520 via the worm 710 and the worm gear 720. However, the disclosure is not limited to the above-mentioned configuration. Please refer to FIG. 7 which is a side view of a derailleur according to a third embodiment of the disclosure.

Figure 7:
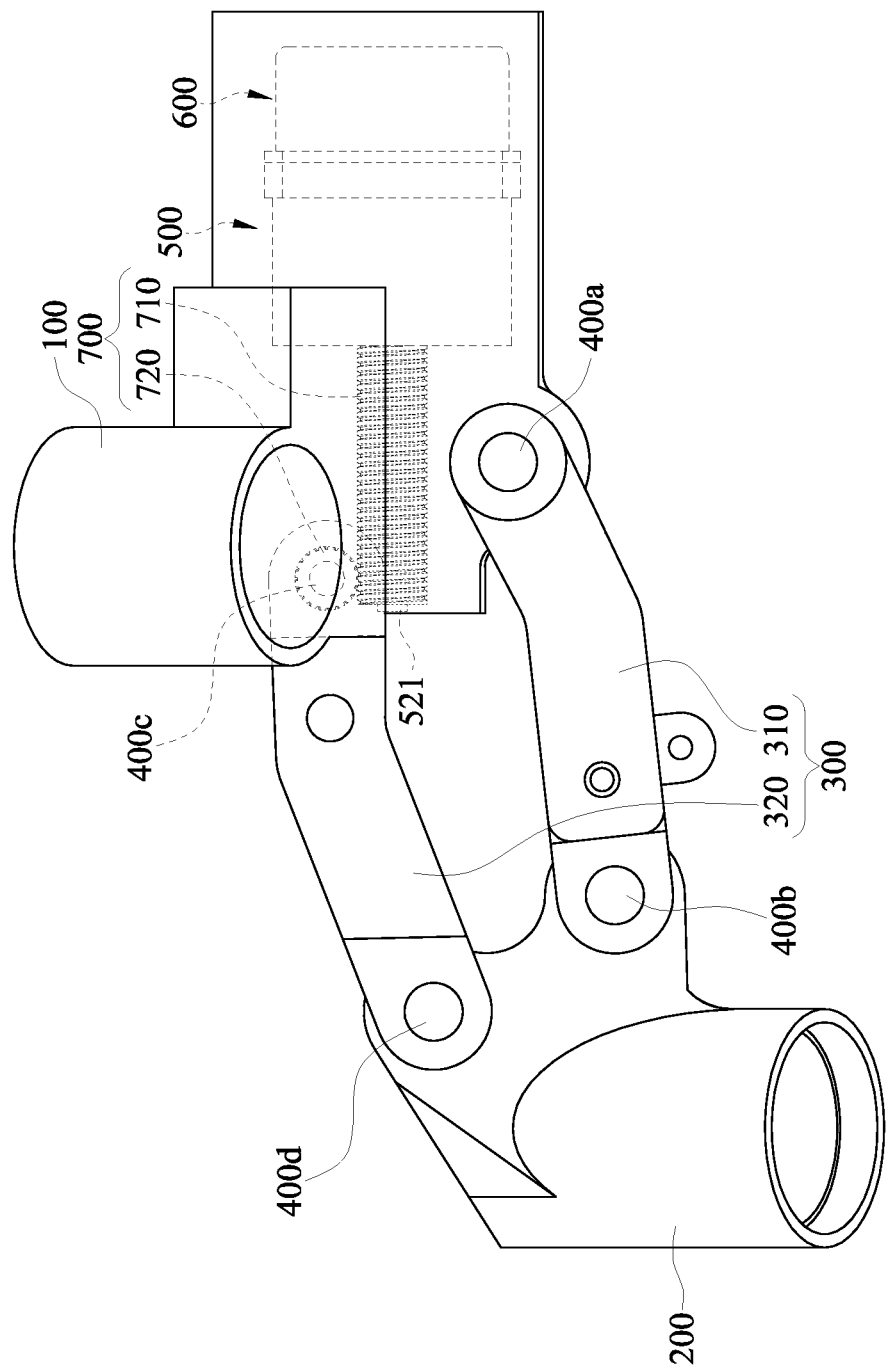
FIG. 7 is a side view of a derailleur according to a third embodiment of the disclosure.

According to the third embodiment shown in FIG. 7, the pivot pin 400b connected to the fixed component 100 and the second linkage 320 is driven to rotate by the first torque output shaft 521 of the flex spline 520 via the worm 710 and the worm gear 720. Thus, when the first torque output shaft 521 rotates, the second linkage 320 is driven to rotate relative to the fixed component 100 by the transmission component 700 and the pivot pin 400*b*, and the movable component 200 is driven to rotate relative to the fixed component 100.

In the first embodiment shown in FIG. 1, the deceleration component 500 is fixed to the fixed component 100. However, the disclosure is not limited to the above-mentioned configuration. Please refer to FIG. 8 which is a side view of a derailleur according to a fourth embodiment of the disclosure. In this embodiment, both the deceleration component 500 and the drive component 600 are fixed to the movable component 200. Moreover, the pivot pin 400*c* connected to the movable component 200 and the first linkage 310 is driven to rotate via the worm 710 and the worm gear 720. Accordingly, when the first torque output shaft 521 rotates, the first linkage 310 is driven to rotate relative to the fixed component 100 by the transmission component 700 and the pivot pin 400*c*.

Figure 8:
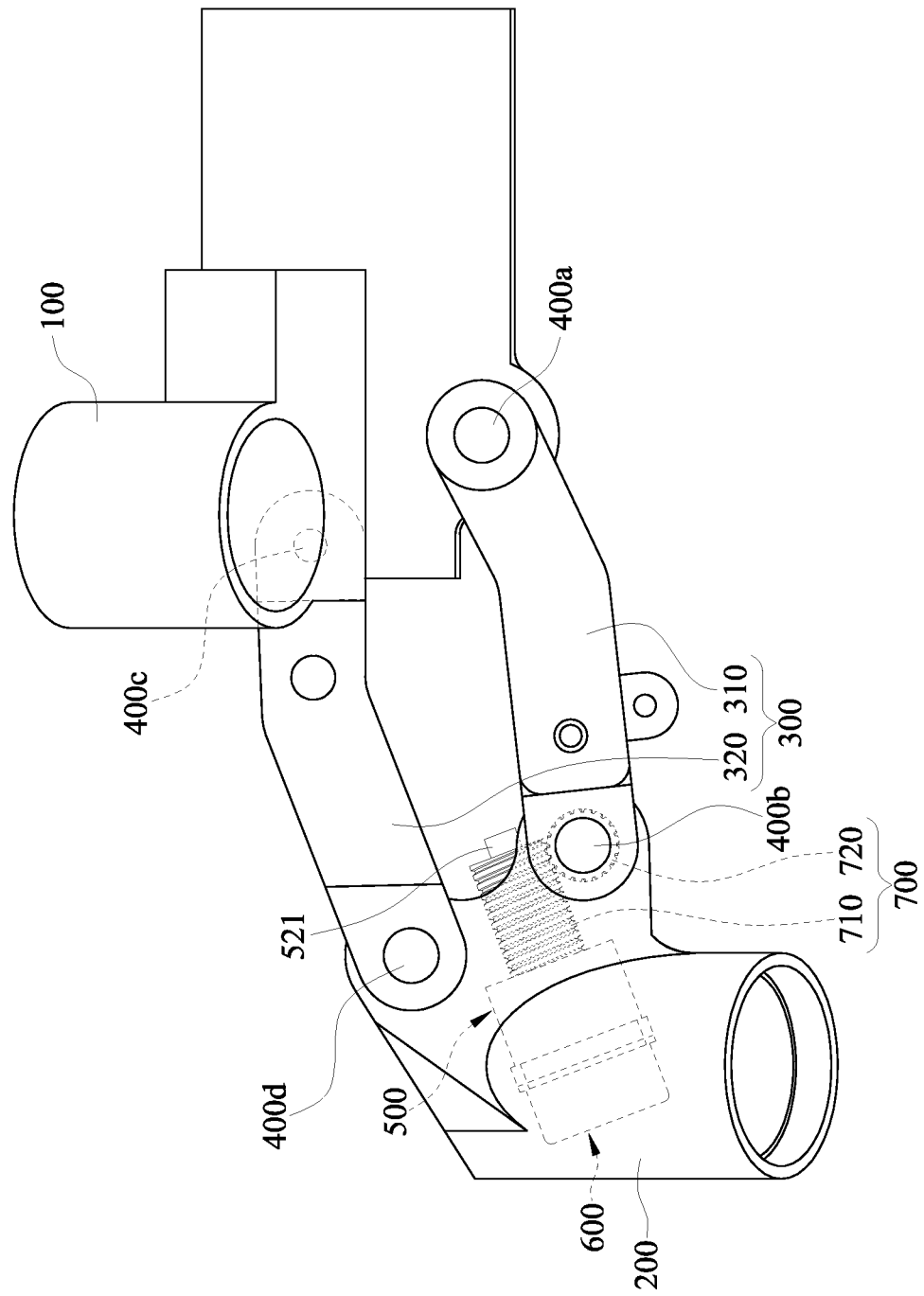
FIG. 8 is a side view of a derailleur according to a fourth embodiment of the disclosure.
Figure 9:
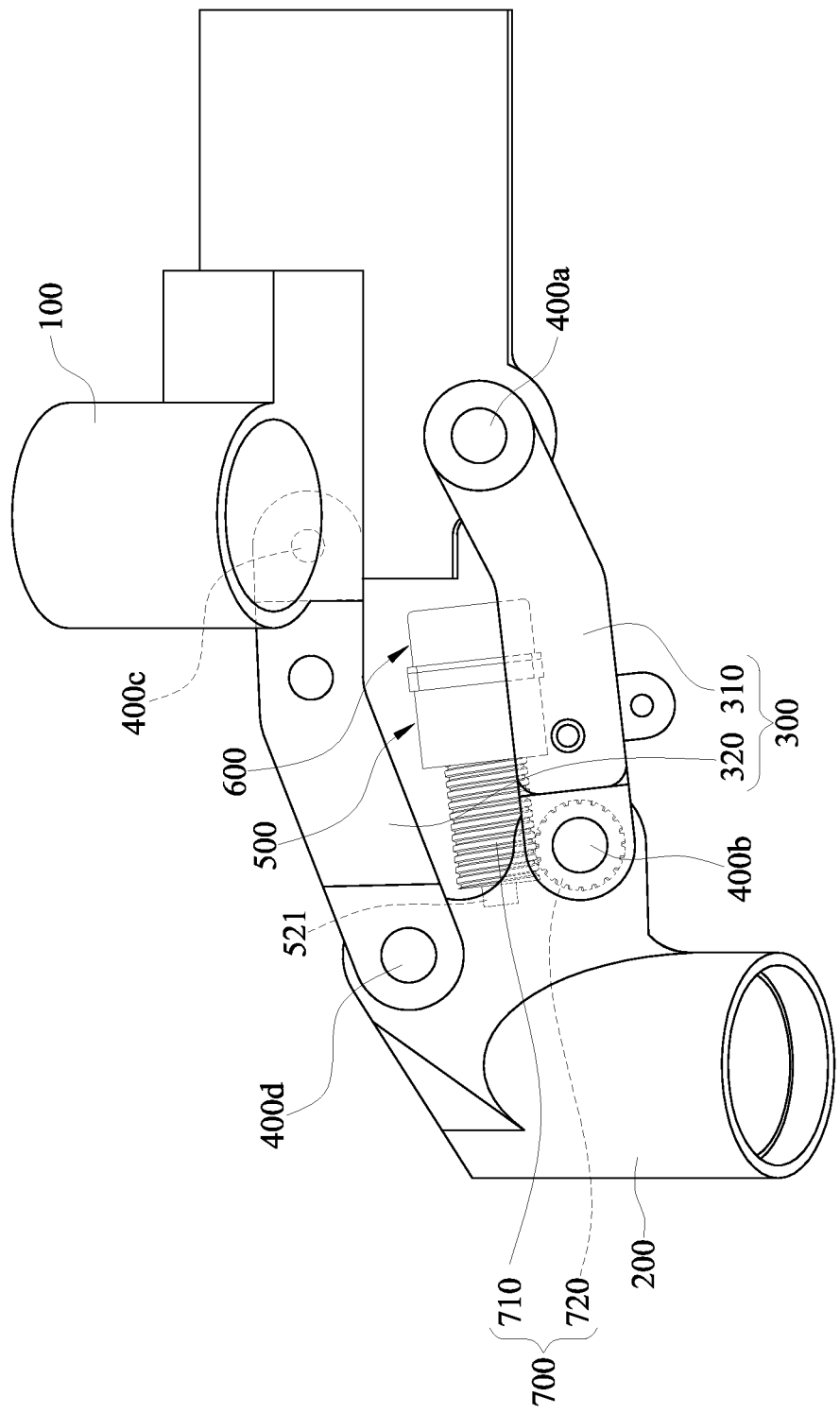
FIG. 9 is a side view of a derailleur according to a fifth embodiment of the disclosure.

The places of the deceleration component 500 and the drive component 600 are, but not limited to, fixed to the movable component 200 according to the fourth embodiment shown in FIG. 8. Please refer to FIG. 9 which is a side view of a derailleur according to a fifth embodiment of the disclosure. As shown in FIG. 9, both the deceleration component 500 and the drive component 600 are fixed to the first linkage 310. Additionally, in other embodiments (not shown in figures), both the deceleration component 500 and the drive component 600 are fixed to the second linkage 320.

Figure 10A:
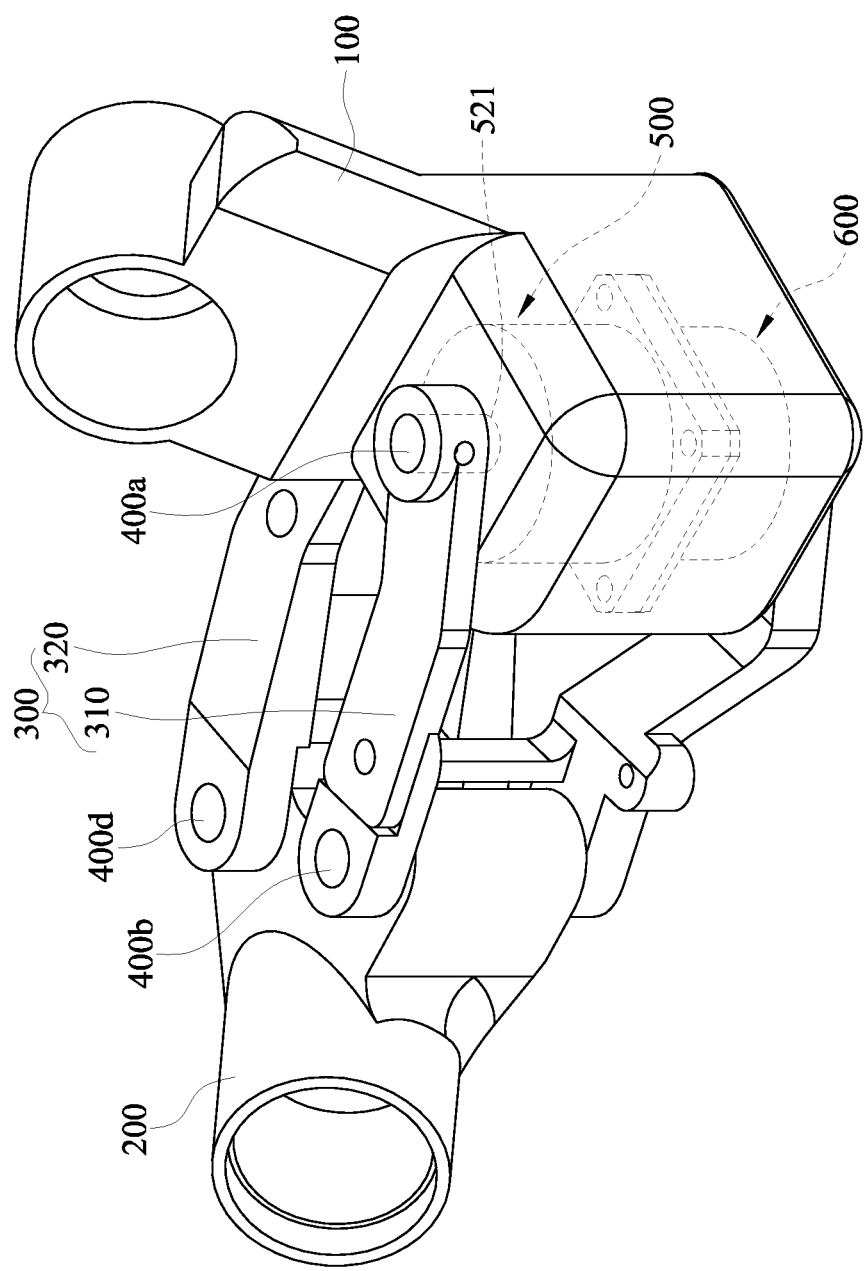
FIG. 10A is a perspective view of a derailleur according to a sixth embodiment of the disclosure.
Figure 10B:
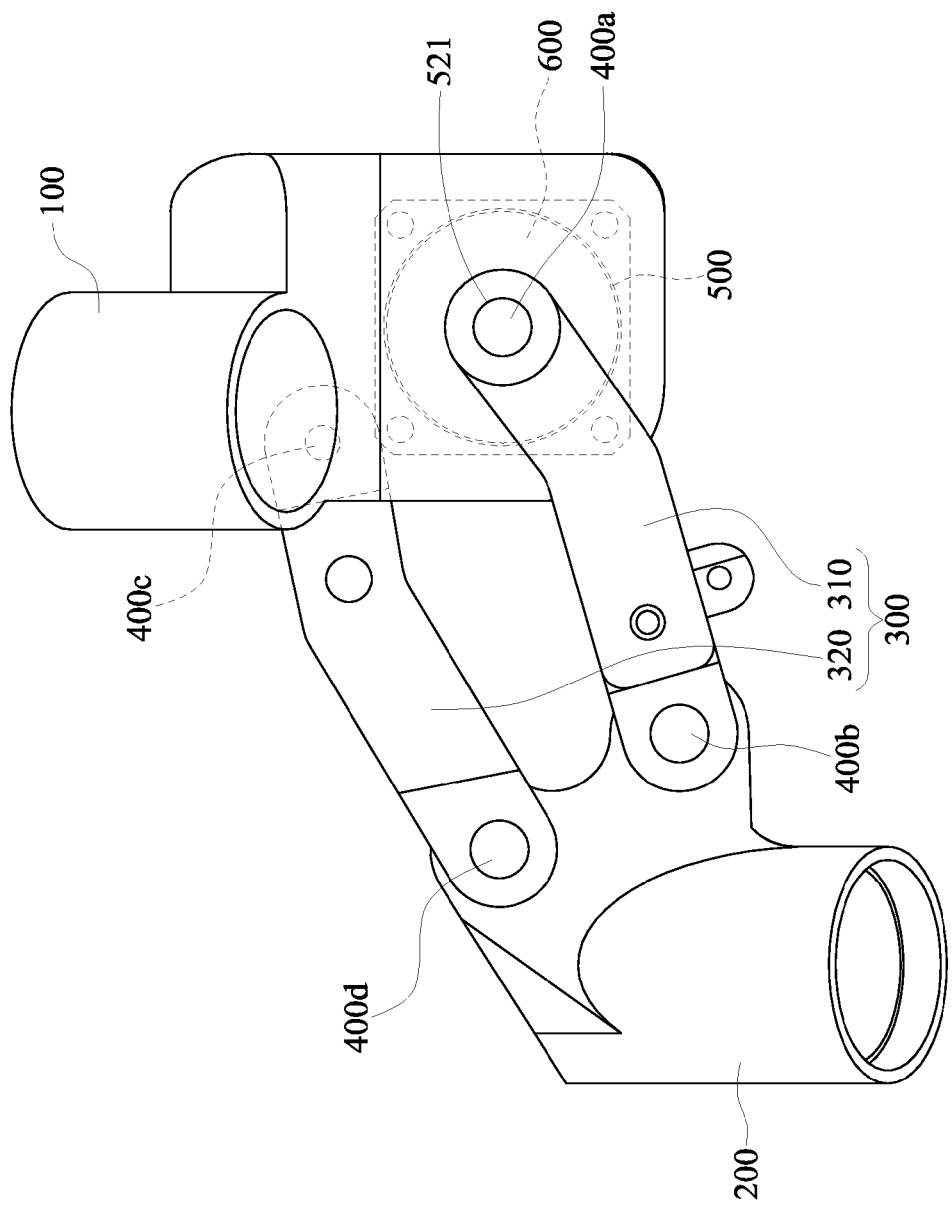
FIG. 10B is a side view of the derailleur in FIG. 10A.

Please refer to FIG. 10A and FIG. 10B. FIG. 10A is a perspective view of a derailleur according to a sixth embodiment of the disclosure. FIG. 10B is a side view of the derailleur in FIG. 10A. This embodiment is similar to the first embodiment. The differences between this embodiment and the eleventh embodiment are that the derailleur 10 does not include the transmission component 700, and the first torque output shaft 521 is fixed to the pivot pin 400*a* coaxially and directly. Namely, the first torque output shaft 521 and the pivot pin 400*a* are formed integrally into a single unit in this embodiment. Accordingly, when the first torque output shaft 521 rotates, the first linkage 310 is driven to rotate relative to the fixed component 100, and the movable component 200 is driven to rotate relative to the fixed component 100.

In this embodiment, the first torque output shaft 521 is fixed to the pivot pin 400*a* coaxially and directly. Namely, the first torque output shaft 521 is connected to the pivot pin 400*a* without any gearbox, for preventing from generating backlashes. Accordingly, the stability and accuracy of the derailleur 10 is maintained even without the elastic component 750 shown in FIG. 6.

Figure 11:
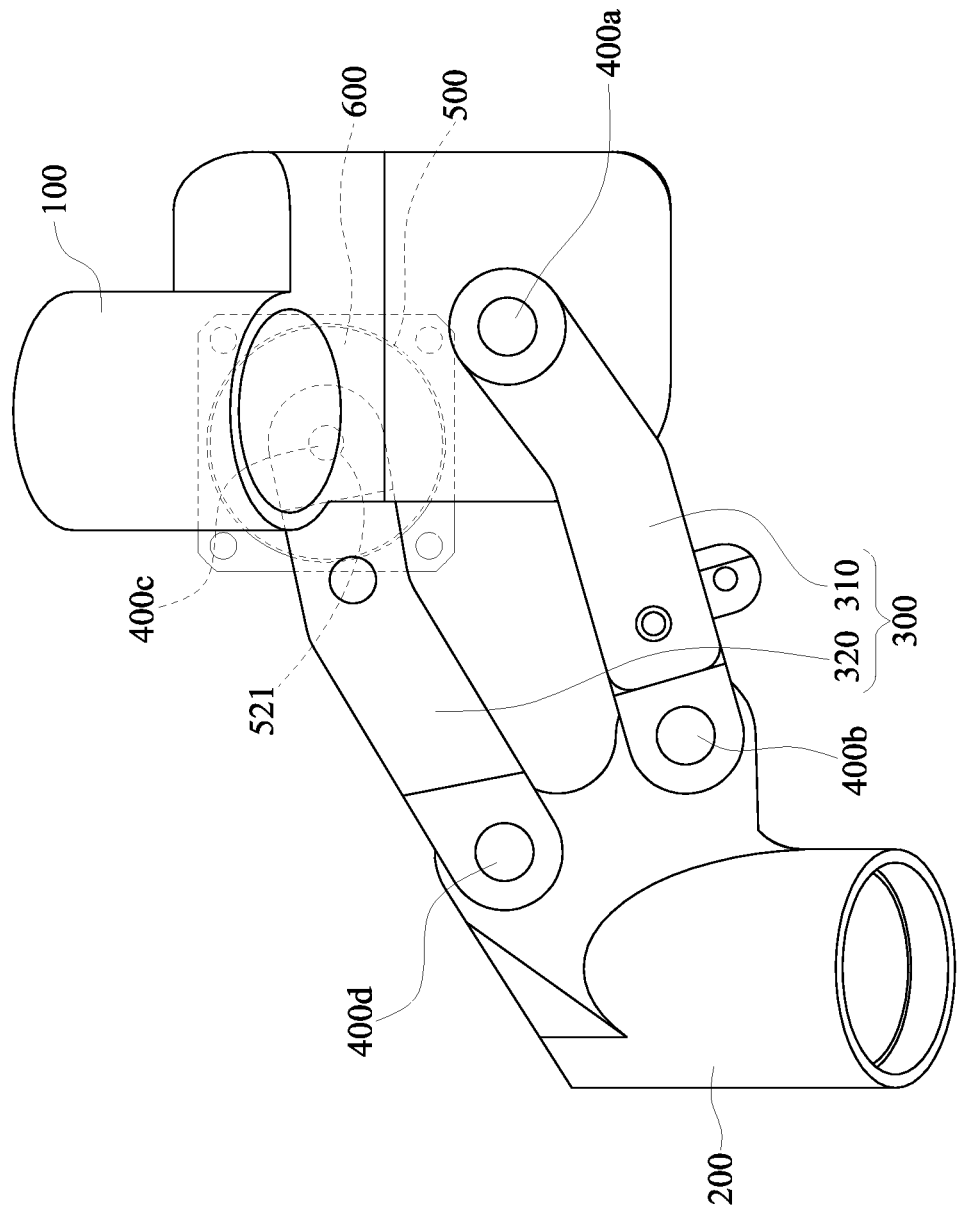
FIG. 11 is a side view of a derailleur according to a seventh embodiment of the disclosure.

Please refer to FIG. 11 which is a side view of a derailleur according to a seventh embodiment of the disclosure. This embodiment is similar to the sixth embodiment shown in FIG. 10A. The difference between this embodiment and the sixth embodiment is that the first torque output shaft 521 is fixed to the pivot pin 400*c* coaxially and directly.

Figure 12:
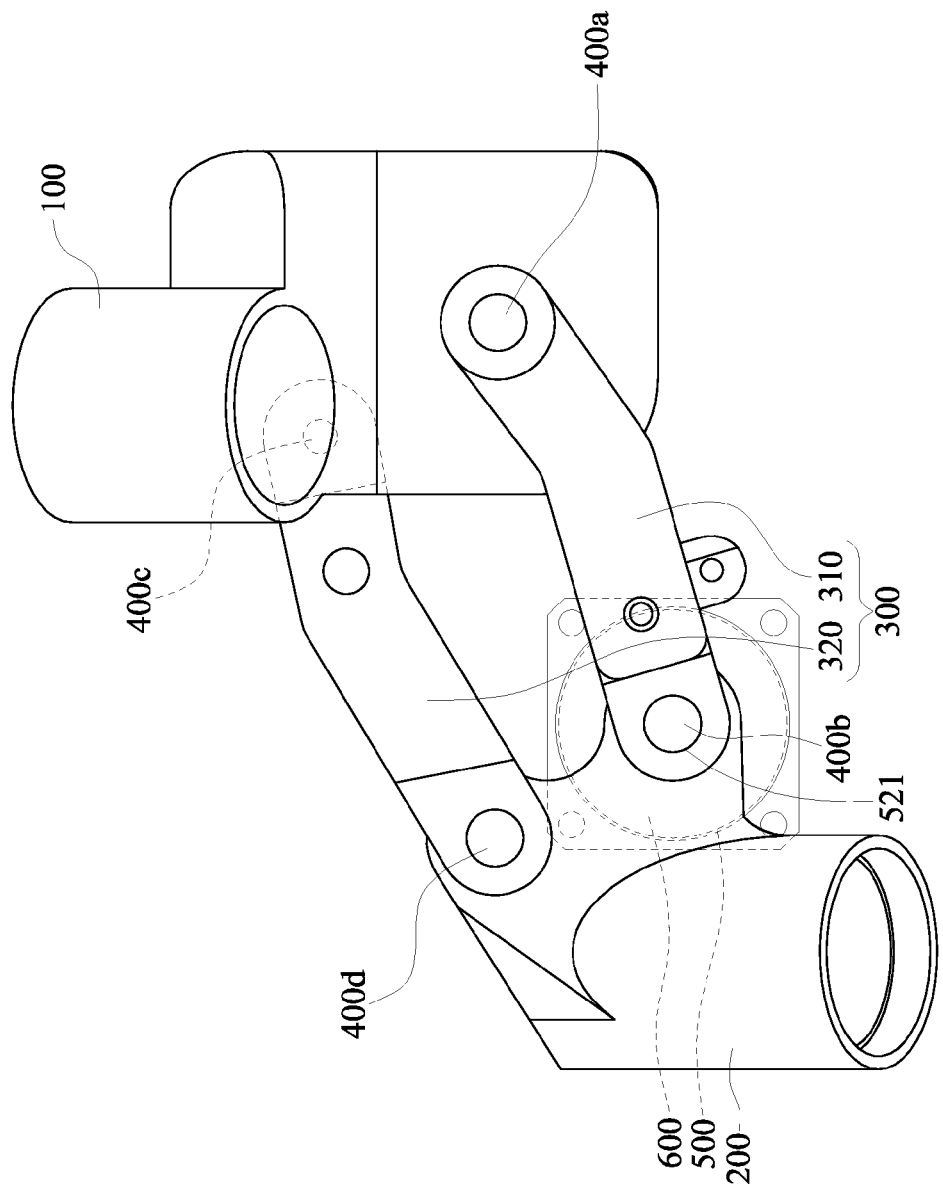
FIG. 12 is a side view of a derailleur according to an eighth embodiment of the disclosure.

Please refer to FIG. 12 which is a side view of a derailleur according to an eighth embodiment of the disclosure. This embodiment is similar to the sixth embodiment shown in FIG. 10A. The differences between this embodiment and the sixth embodiment are that both the deceleration component 500 and the drive component 600 are fixed to the movable component 200, and the first torque output shaft 521 of the flex spline 520 is fixed to the pivot pin 400*b* coaxially and directly.

Figure 13:
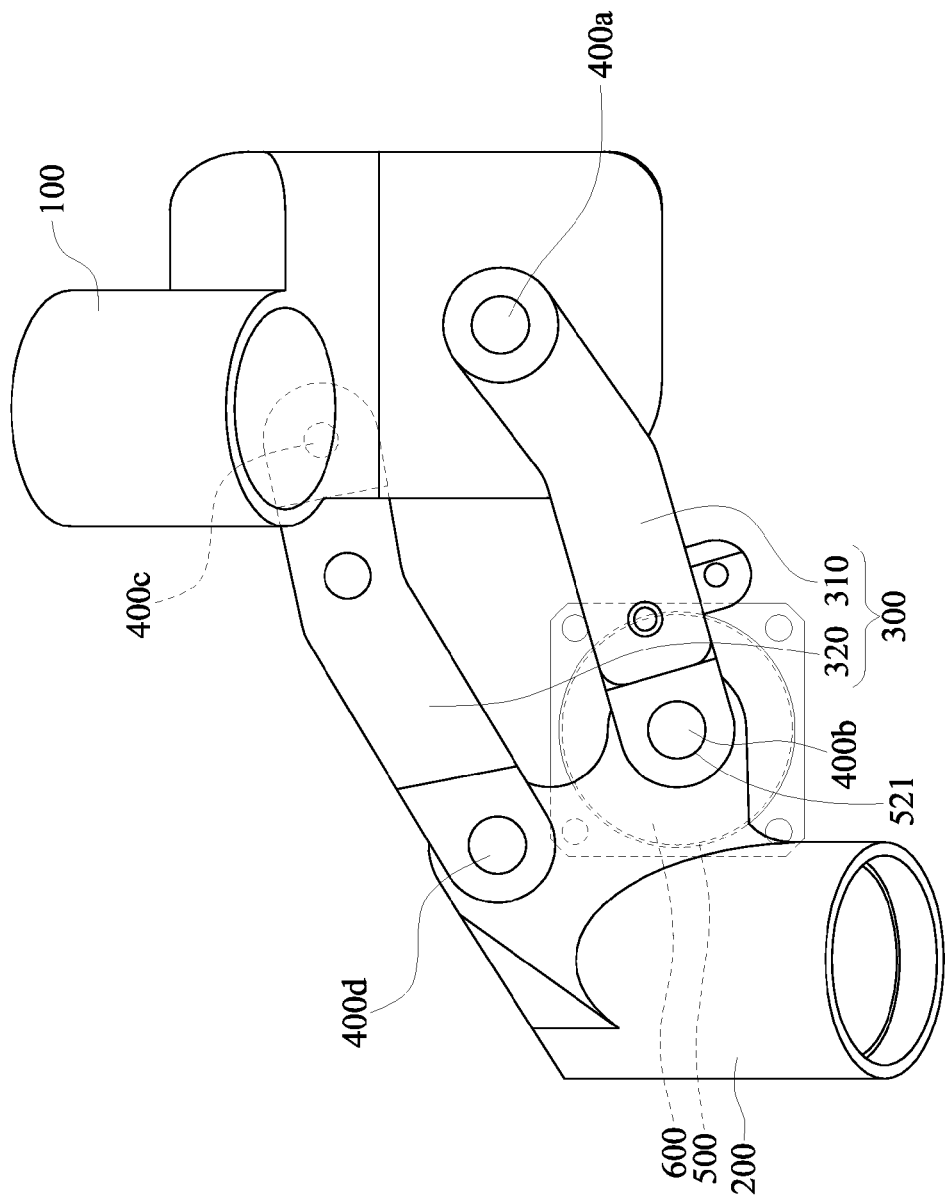
FIG. 13 is a side view of a derailleur according to a ninth embodiment of the disclosure.

Please refer to FIG. 13 which is a side view of a derailleur according to a ninth embodiment of the disclosure. This embodiment is similar to the sixth embodiment shown in FIG. 10A. The difference between this embodiment and the sixth embodiment is that both the deceleration component 500 and the drive component 600 are fixed to the first linkage 310. Moreover, in other embodiments (not shown in figures), the deceleration component 500 and the drive component 600 are fixed to the second linkage 320, and the first torque output shaft 521 of the flex spline 520 is fixed to the pivot pin 400*c* or the pivot pin 400*d* coaxially and directly.

Figure 14A:
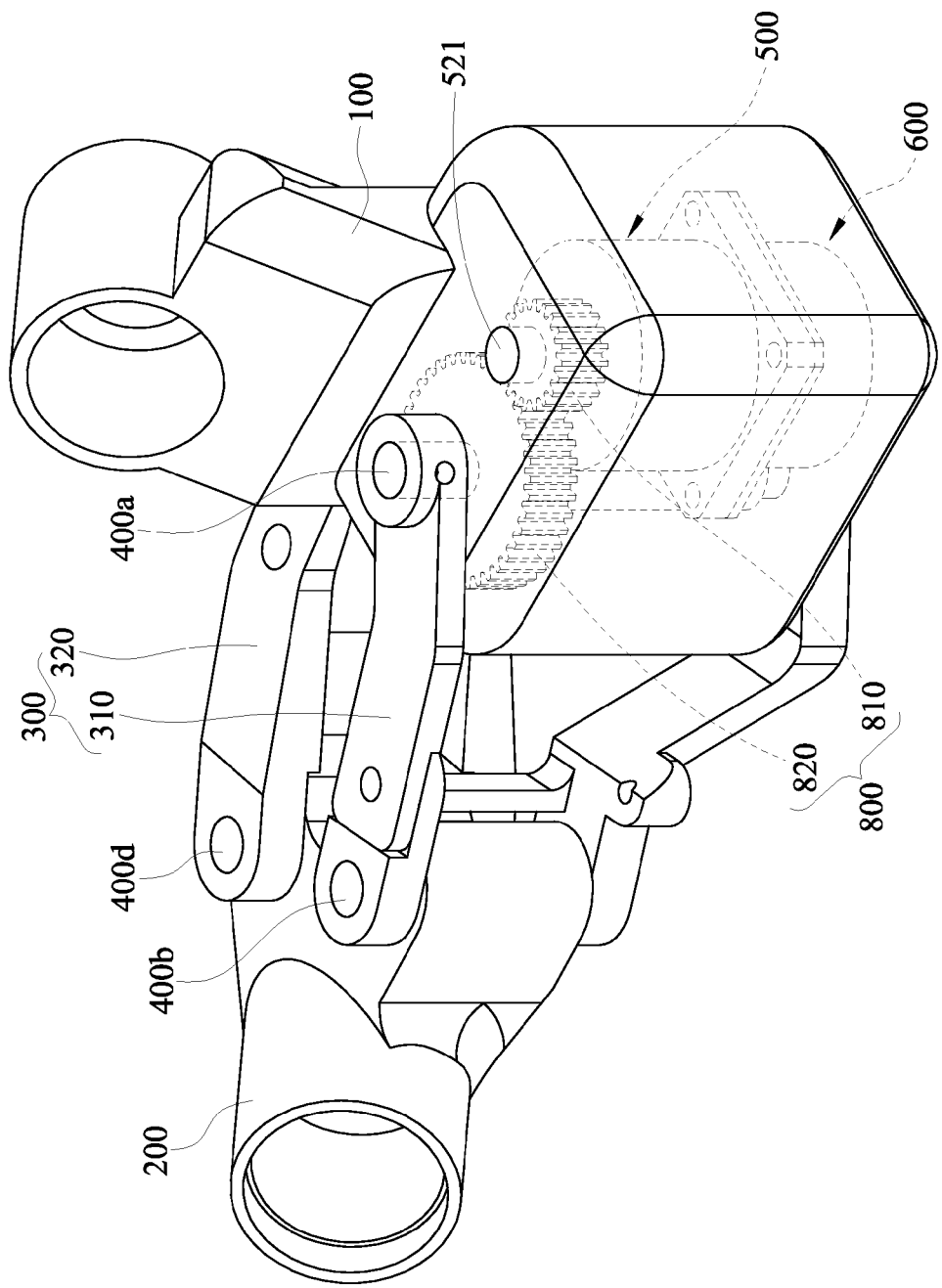
FIG. 14A is a perspective view of a derailleur according to a tenth embodiment of the disclosure.
Figure 14B:
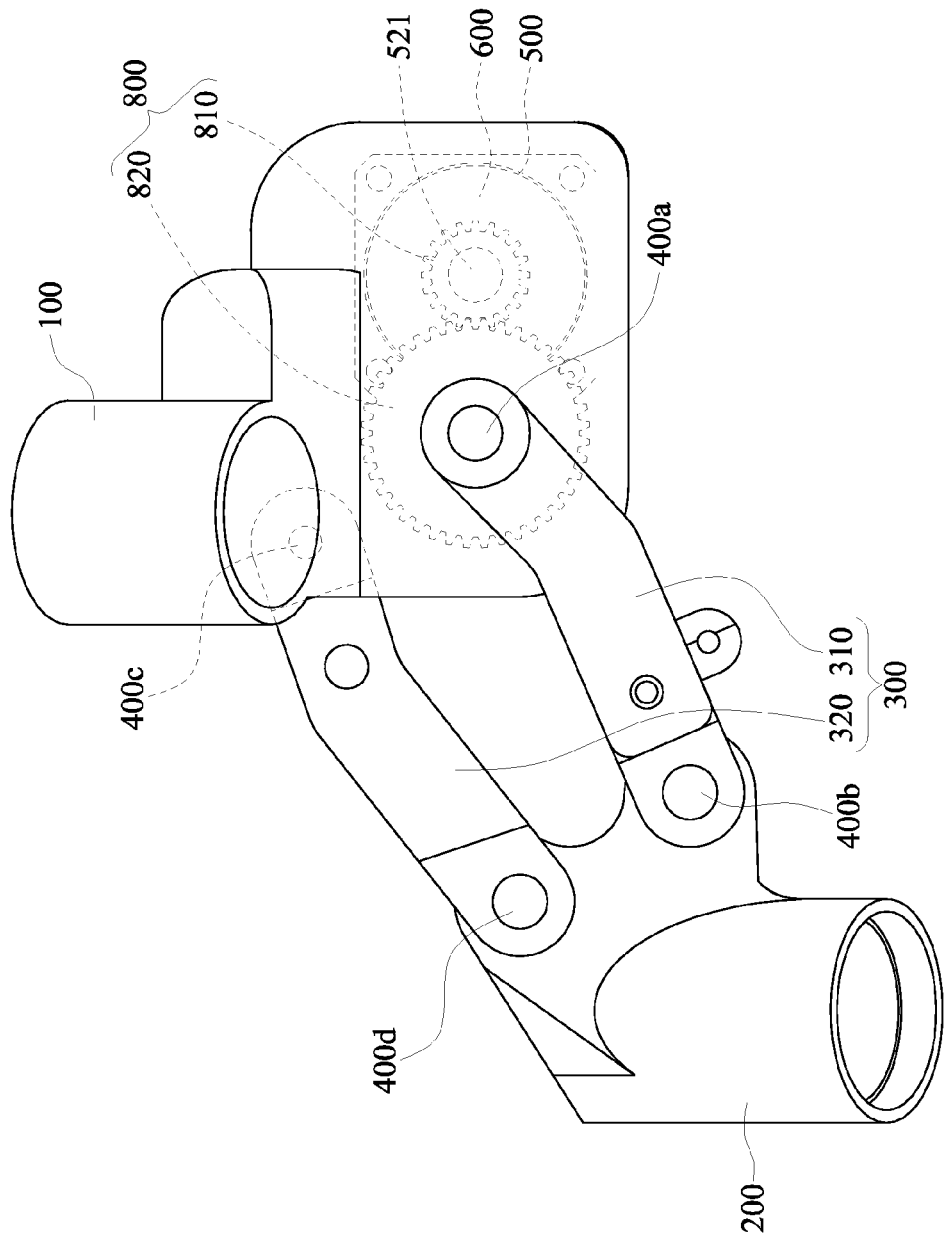
FIG. 14B is a side view of the derailleur in FIG. 14A.

According to the first embodiment shown in FIG. 1, the transmission component 700 is the worm set including the worm gear 720 and the worm 710. However, the disclosure is not limited to the above-mentioned configuration. Please refer to FIG. 14A and FIG. 14B. FIG. 14A is a perspective view of a derailleur according to a tenth embodiment of the disclosure. FIG. 14B is a side view of the derailleur in FIG. 14A In this embodiment, the deceleration component 500 and the drive component 600 are fixed to the fixed component 100, and the linkage component 300 is driven to move by the first torque output shaft 521 of the flex spline 520 of the deceleration component 500 via the transmission component 800 and the pivot pin 400*a*. Specifically, the first linkage 310 and the second linkage 320 of the linkage component 300 pivot on the fixed component 100 and the movable component 200 via the pivot pins 400*a*, 400*b*, 400*c* and 400*d*. The transmission component 800 includes a first gear 810 and a second gear 820 which are meshed with each other. The quantity of teeth of the first gear 810 is less than that of the second gear 820. The first gear 810 is fixed to the first torque output shaft 521, and the second gear 820 is fixed to the pivot pin 400*a* connected to both the fixed component 100 and the first linkage 310. Thus, when the first torque output shaft 521 rotates, the first linkage 310 is driven to rotate relative to the fixed component 100 by the transmission component 800 and the pivot pin 400*a*. Furthermore, since the quantity of teeth of the first gear 810 is less than that of the second gear 820, a deceleration effect is additionally achieved by the transmission component 800.

Figure 15:
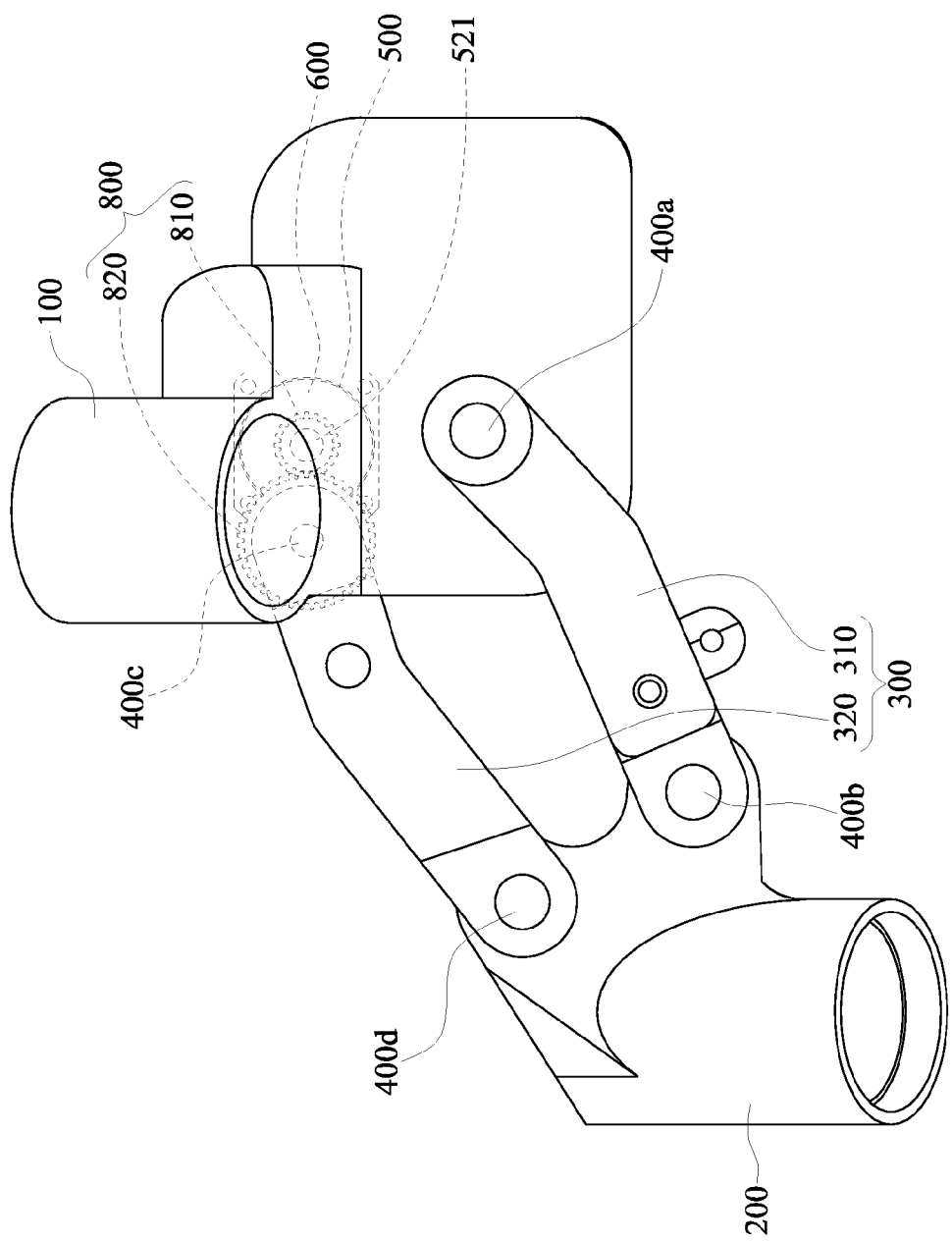
FIG. 15 is a side view of a derailleur according to an eleventh embodiment of the disclosure.

Please refer to FIG. 15 which is a side view of a derailleur according to an eleventh embodiment of the disclosure. This embodiment is similar to the tenth embodiment in FIG. 14A. The difference between this embodiment and the eleventh embodiment is that the pivot pin 400*c* connected to both the fixed component 100 and the second linkage 320 is driven to rotate by the first torque output shaft 521 of the flex spline 520 via the first gear 810 and the second gear 820.

Figure 16:
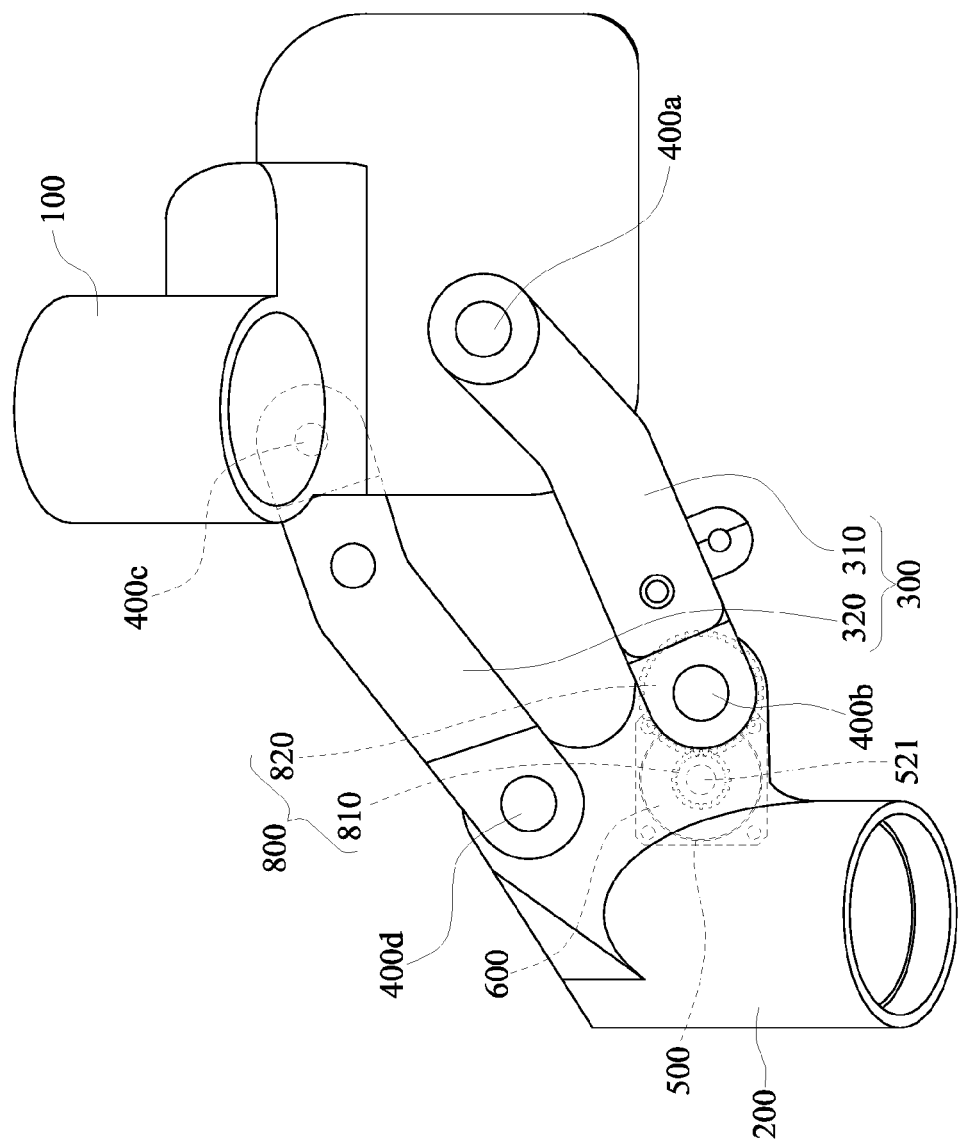
FIG. 16 is a side view of a derailleur according to a twelfth embodiment of the disclosure.

Please refer to FIG. 16 which is a side view of a derailleur according to a twelfth embodiment of the disclosure. This embodiment is similar to the tenth embodiment in FIG. 14A. The difference between this embodiment and the eleventh embodiment is that both the deceleration component 500 and the drive component 600 are fixed to the movable component 200. Moreover, the pivot pin 400*b* connected to both the movable component 200 and the first linkage 310 is driven to rotate via the first gear 810 and the second gear 820 that are meshed with each other.

Figure 17:
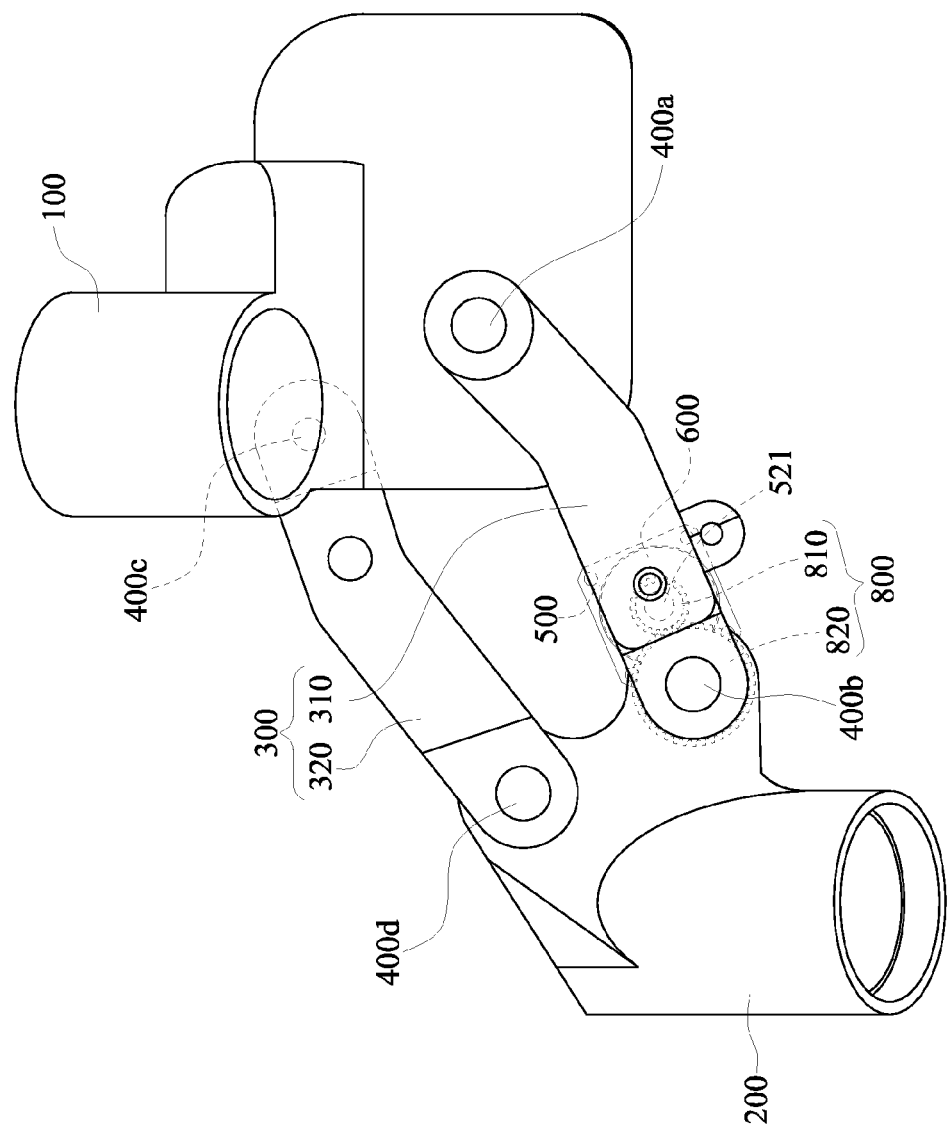
FIG. 17 is a side view of a derailleur according to a thirteenth embodiment of the disclosure.

Please refer to FIG. 17 which is a side view of a derailleur according to a thirteenth embodiment of the disclosure. This embodiment is similar to the tenth embodiment in FIG. 14A. The difference between this embodiment and the eleventh embodiment is that both the deceleration component 500 and the drive component 600 are fixed to the first linkage 310 in the eleventh embodiment. Additionally, in other embodiments (not shown in figures), both the deceleration component 500 and the drive component 600 are fixed to the second linkage 320.

To sun up, the derailleur has high speed reduction ratio and becomes smaller in size and lighter in weight due to the combination of the circular spline, the flex spline and the wave generator of the deceleration component. Compared with a conventional gearbox with the same speed reduction ratio, the derailleur is well suited to bicycles.

The disclosure will become more fully understood from the said embodiment for illustration only and thus does not limit the disclosure. Any modifications within the spirit and category of the disclosure fall in the scope of the disclosure.

What is claimed is:

1. A derailleur, comprising:
a fixed component for being fixed to a bicycle frame;
a movable component for being fixed to a chain guide;
a linkage component comprising a first linkage with two ends which are opposite to each other and a second linkage with two ends which are opposite to each other, the two ends of the first linkage pivoting on the fixed component and the movable component, respectively, and the two ends of the second linkage pivoting on the fixed component and the movable component, respectively;
a deceleration component comprising:
a circular spline;
a flex spline disposed inside the circular spline, for rotating the first linkage and the second linkage relative to the fixed component; and
a wave generator disposed inside the flex spline; and
a drive component connected to the wave generator, for rotating the wave generator.

2. The derailleur according to claim 1, further comprising a plurality of pivot pins, the flex spline further having a first torque output shaft, the first linkage and the second linkage pivoting on the fixed component and the movable component via the plurality of pivot pins, and the first torque output shaft being fixed to one of the plurality of pivot pins.

3. The derailleur according to claim 2, wherein the circular spline of the deceleration component is fixed to the fixed component.

4. The derailleur according to claim 2, wherein the circular spline of the deceleration component is fixed to the movable component.

5. The derailleur according to claim 2, wherein the circular spline of the deceleration component is fixed to the first linkage.

6. The derailleur according to claim 2, wherein the circular spline of the deceleration component is fixed to the second linkage.

7. The derailleur according to claim 1, further comprising a plurality of pivot pins and a transmission component, the first linkage and the second linkage pivoting on the fixed component and the movable component via the plurality of pivot pins, the flex spline further having a first torque output shaft, the transmission component being connected to the first torque output shaft and one of the plurality of pivot pins for transmitting power to the first torque output shaft and the one of the plurality of pivot pins.

8. The derailleur according to claim 7, wherein the circular spline of the deceleration component is fixed to the fixed component.

9. The derailleur according to claim 7, wherein the circular spline of the deceleration component is fixed to the movable component.

10. The derailleur according to claim 7, wherein the circular spline of the deceleration component is fixed to the first linkage.

11. The derailleur according to claim 7, wherein the circular spline of the deceleration component is fixed to the second linkage.

12. The derailleur according to claim 7, wherein the transmission component comprises a worm and a worm gear, the worm is fixed to the first torque output shaft coaxially, and the worm gear is fixed to the one of the plurality of pivot pins and meshed with the worm.

13. The derailleur according to claim 7, wherein the transmission component comprises a first gear and a second gear, the first gear is fixed to the first torque output shaft coaxially, and the second gear is fixed to one of the plurality of pivot pins and meshed with the first gear.

14. The derailleur according to claim 1, further comprising an elastic component with two ends which are opposite to each other, the two ends of the elastic component being connected to an end of the first linkage which is away from the fixed component and an end of the second linkage which is near the fixed component, respectively.

15. The derailleur according to claim 14, wherein the elastic component is a tension spring.

* * * * *